United States Patent [19]
Johnson et al.

[11] Patent Number: 5,238,975
[45] Date of Patent: Aug. 24, 1993

[54] MICROWAVE RADIATION ABSORBING ADHESIVE

[75] Inventors: Eric J. Johnson, Woodbury; Charles E. Boyer, III, Oakdale; Edmond J. Nielson, Lake Elmo; Chris A. Minick, Stillwater, all of Minn.

[73] Assignee: Minnesota Mining and Manufacturing Company, St. Paul, Minn.

[21] Appl. No.: 989,838

[22] Filed: Dec. 14, 1992

Related U.S. Application Data

[63] Continuation of Ser. No. 423,220, Oct. 18, 1989, Pat. No. 5,189,078.

[51] Int. Cl.⁵ .......................... G21K 1/10; C08K 3/22
[52] U.S. Cl. ..................... 523/137; 523/216; 523/217; 524/431; 524/440; 524/441; 428/344; 428/355; 428/356
[58] Field of Search .......... 428/344, 355, 356; 523/137, 216, 217; 524/431, 440, 441

[56] References Cited

U.S. PATENT DOCUMENTS

| | | | |
|---|---|---|---|
| 3,007,160 | 10/1961 | Halpern | 343/18 |
| 3,240,621 | 3/1966 | Flower, Jr. et al. | 117/93.2 |
| 3,526,896 | 9/1970 | Wesch | 343/18 |
| 3,742,176 | 6/1973 | Ishino et al. | 523/137 |
| 3,806,928 | 4/1974 | Costanza | 343/18 A |
| 3,843,593 | 10/1974 | Shell et al. | 260/40 R |
| 3,865,627 | 2/1975 | Roden et al. | 117/240 |
| 3,866,009 | 2/1975 | Ishino et al. | 523/137 |
| 3,938,152 | 2/1976 | Grimes et al. | 343/18 A |
| 3,951,904 | 4/1976 | Tomonaga et al. | 260/40 R |
| 4,003,840 | 1/1977 | Ishino et al. | 252/62 |
| 4,024,318 | 5/1977 | Forster et al. | 428/519 |
| 4,034,375 | 7/1977 | Wallin | 343/18 A |
| 4,046,983 | 9/1977 | Ishino et al. | 523/137 |
| 4,116,906 | 9/1978 | Ishino et al. | 260/22 A |
| 4,173,018 | 10/1979 | Dawson et al. | 343/18 A |
| 4,226,909 | 10/1980 | Kanten | 428/329 |
| 4,408,255 | 10/1983 | Adkins | 361/382 |
| 4,414,339 | 11/1983 | Solc et al. | 523/137 |
| 4,538,151 | 8/1985 | Hatakeyama et al. | 343/18 A |
| 4,606,848 | 8/1986 | Bond | 252/511 |
| 4,618,525 | 10/1986 | Chamberlain et al. | 428/209 |
| 4,624,798 | 11/1986 | Gindrup et al. | 252/62.54 |
| 4,624,865 | 11/1986 | Gindrup et al. | 427/126.2 |
| 4,626,642 | 12/1986 | Wang et al. | 219/10.55 |
| 4,664,971 | 5/1987 | Soens | 428/288 |
| 4,690,778 | 9/1987 | Narumiya et al. | 252/506 |
| 4,752,525 | 6/1988 | Oyachi et al. | 428/323 |
| 4,785,148 | 11/1988 | Mayer | 524/431 |
| 4,814,546 | 3/1989 | Whitney et al. | 174/36 |
| 4,822,673 | 4/1989 | Umemura | 428/328 |
| 4,906,497 | 3/1990 | Hellmann et al. | 428/49 |
| 4,929,574 | 5/1990 | Iltis et al. | 501/137 |
| 4,952,448 | 8/1990 | Bullock et al. | 428/323 |
| 4,962,000 | 10/1990 | Emslander et al. | 428/461 |

FOREIGN PATENT DOCUMENTS 59-110199 6/1984 Japan .
62-248247 10/1987 Japan .

OTHER PUBLICATIONS

Second College Edition, The American Heritage Dictionary, p. 213 Hawley's Condensed Chemical Dictionary, Eleventh Edition, p. 802.
Application No. 07/302,427 (Boyer et al.) Filed Jan. 26, 1989.
Application No. 07/335,044 (Chamberlain et al.) Filed Apr. 7, 1989.
David L. Dye et al., "Theoretical Investigation of Fibers," Boeing Aerospace Company, Seattle, Wash., draft report for Department of Defense contract DAAK11-82-C-0152, 1983, pp. 3-5, 10-11, 13-19, 27-44, 101-111, 142-144.
"RAM Maintenance Procedures (Interim)," U.S. Navy, Oct. 1985.
Ruck et al., "Radar Cross Section Handbook," vol. 2, pp. 617-622, Section 8.3.2.1.1.3, Plenum Press 1970.

Primary Examiner—Melvyn I. Marquis
Assistant Examiner—Karen A. Dean
Attorney, Agent, or Firm—Gary L. Griswold; Warren R. Bovee; Peter Forrest

[57] ABSTRACT

A microwave radiation absorbing adhesive comprises dissipative particles bound in a thermoplastic or thermosetting adhesive The absorbing adhesive may be applied directly to the surface of any object, or to an irregularly shaped object, or into cracks or crevices in or between objects, including conventional absorbers. Several types of dissipative particles and adhesives may be used.

4 Claims, 1 Drawing Sheet

MICROWAVE RADIATION ABSORBING ADHESIVE

CROSS-REFERENCE TO RELATED APPLICATION

This application is a continuation of patent application No. 07/423,220, filed on Oct. 18, 1989 entitled "Microwave Radiation Absorbing Adhesive," which is assigned to the assignee of this application U.S. Pat. No. 5,189,078.

TECHNICAL FIELD

Microwave radiation absorbers typically are non-conductive composites of one or more kinds of dissipative particles dispersed through bulk dielectric binder materials. The absorption performance of the composite absorber depends predominantly on the electromagnetic interactions of the individual particles with each other and with the binder. Thickness, weight, and ease of application of the composite absorber are important practical considerations. Thus, the physical properties of all portions of an absorber are important design features, as are the electromagnetic properties of the components.

SUMMARY OF INVENTION

The invention is a microwave radiation absorbing adhesive comprising dissipative particles dispersed in a thermosetting or thermoplastic dielectric adhesive binder. The invention is suitable for application to any object, but especially to irregularly shaped objects, or into cracks or crevices in or between objects.

DETAILED DESCRIPTION

Figure 1:
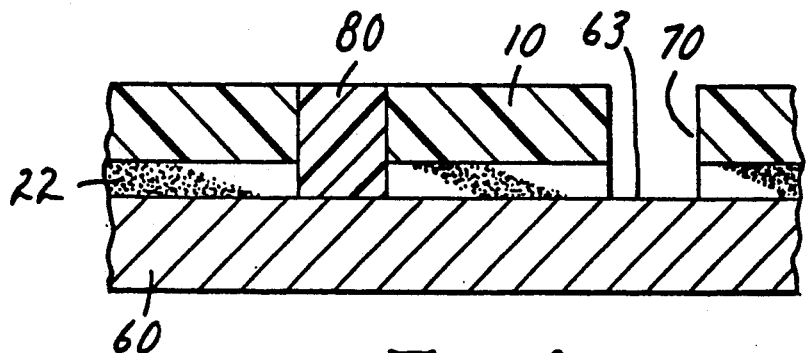
FIG. 1 is a sectional view of an embodiment of the invention, shown applied to a surface.

The invention is suitable for absorbing radiation over as broad an incident frequency range as possible in the microwave region of approximately 2 to 20 GHz. The invention comprises a composite of dissipative particles and a dielectric adhesive binder. More than one type of dissipative particle may be used in a single absorber to tailor the absorption versus frequency characteristics to a particular application. The volume loading factor (dissipative particle volume as a percentage of total absorber volume) is typically in the range of 1 to 60 percent, preferably 10 to 50 percent.

The dissipative particles may be either solid or hollow spheres made from a dissipative material itself; solid or hollow spherical substrates made of organic or inorganic material and coated with a layer of dissipative material; filaments made from a dissipative material; or flakes made from a dissipative materials.

In this specification, a solid sphere or solid spherical substrate will be referred to as a "sphere," and a hollow sphere or hollow spherical substrate will be referred to as a "bubble."

Suitable dissipative materials include (but are not limited to) tungsten, chromium, aluminum, copper, titanium, titanium nitride, molybdenum disilicide, iron, nickel, and carbon (including graphite). Suitable spherical substrates include ceramics (including glass), metals and polymers. The particles may range in diameter from 0.1 to 150 microns, hence the names "microspheres" and "microbubbles," although the particles need not be exactly spherical. Preferably the particles are about 50 microns in diameter. If comprised of a spherical substrate material coated with a dissipative layer, the layer may be between 0 5 and 10 nm, preferably about 2 nm, although the thickness depends on the identity of the material.

One preferred type of dissipative particles is acicular magnetic metallic polycrystalline filaments which have an average length of about 10 microns or less, diameters of about 0.1 micron or more, and aspect ratios between 50:1 and 10:1. Preferred materials are iron, nickel, cobalt and their alloys. The use of these filaments in an insulating microwave radiation absorber is taught in U.S. patent application No. 07,302,427 entitled "MICROWAVE ABSORBER EMPLOYING ACICULAR MAGNETIC METALLIC FILAMENTS," filed Jan. 26, 1989, assigned to the assignee of this application, now U.S. Pat. No. 5,085,931.

Other suitable dissipative particles are based on iron oxide filaments: ferric oxide itself ($\gamma$-$Fe_2O_3$); ferrosoferric oxide ($\gamma$-$(FeO)_xFe_2O_3$) having a thin surface layer of adsorbed cobalt, with x between 1.0 and 1.5 and the surface cobalt providing one to ten percent of the particle weight, in acicular form of length 0.4 micron and aspect ratio about 6:1 to 8:1; or similarly shaped and sized ferric oxide filaments having a thin surface layer of adsorbed cobalt and doubly ionized iron atoms (see U.S. Pat. No. 4,814,546).

The dielectric binder must be a thermosetting or thermoplastic adhesive material. Thermosetting materials, once heated, irreversibly cure and cannot be remelted to be reformed. Thermoplastic materials can be repeatedly heated and reformed. In either case the materials may be heated and set into a form by one or more forces external to the binder. Typically the force is due to heat conduction, or pressure, but it may be the influence of gravity or a vacuum. In this respect the binders suitable for the present invention differ from the "conformable" materials taught in U.S. Pat. No. 4,814,546 (Whitney et al.), which require molecular forces internal to the binder (such as a mechanical stress in a stretchable material) to be responsible for the change in shape of the absorber.

Many types of adhesives have the required thermoplastic or thermosetting properties. An adhesive is a material which forms intimate contact with a surface such that mechanical force can be transferred across the contact interface. Suitable thermoplastic and thermosetting adhesives include (but are not limited to) polyamides, polyethylenes, polypropylenes, polymethylmethacrylates, urethanes, cellulose acetates, vinyl acetates, epoxies, and silicones. Once applied, to be effective, the inventive adhesive should have a thickness in the direction of radiation propagation greater than about one-fourtieth (2.5 percent) of the wavelength to be absorbed. For the microwave region of approximately 2 to 20 GHz, this implies a thickness greater than about 0.375 mm. Thicker amounts generally provide greater absorption, but the increased weight is not desired in many applications. If located in a crack or crevice in or between objects, it generally is undesireable for the absorber to extend above the surface of the object. Thus, while layers having thicknesses up to one-fourth (25 percent) of the absorbed wavelength are possible, they are not as preferred. For example, in the microwave region this upper limit is about 37.5 mm, but sufficient absorption can be obtained with amounts on the order of 2.0 mm or less in thickness.

The adhesive is non-conductive, i.e., it has a higher resistivity than is typical of conductors, despite the possible conductivity of the individual dissipative particles. If the resistivity is too low, the adhesive effectively becomes a conductive material, which reflects microwaves instead of absorbing them. The resistivity of iron, for example, is about $10^{-5}$ ohm-cm at room temperature. Samples of the invention comprising iron filaments had measured resistivities of approximately $6 \times 10^5$ ohm-cm at room temperature, indicating that they were non-conductive.

A preferred use of the invention is a combination of the invention and conventional microwave absorbers. In this context, a "conventional" absorber is one which is hermally stable up to a temperature at least as much as that at which the embodiment of the inventive absorber in use would become sufficiently semi-fluid to flow. In FIG. 1, three pieces of such a conventional absorber 10, shaped as flat tiles, are applied to a conductive object 60 with a non-absorbing adhesive 22.

Individual pieces of the conventional absorber 10 may not completely cover the surface 63 of object 60, leaving crevices 70 between two or more pieces of the conventional absorber 10 as shown, or between a piece of the conventional absorber 10 and any other object (including objects which are not conductive or which do not absorb microwave radiation). This can allow ambient water, especially salt water, to penetrate crevice 70 and corrode conductive portions (if any) of the conventional absorber 10 or object 60. Such corrosion can cause premature failure of the non-absorbing adhesive 22, and possible removal of the conventional absorber 10.

Accurate sizing and placement of the pieces of conventional absorber 10 minimize this problem, but do not eliminate it. Present practice is to position the pieces of the conventional absorber 10 so that they are separated at a distance sufficient to apply a suitable sealant to attempt to prevent water and water vapor from penetrating any crevices 70. The sealants typically used are too viscous to allow for adequate penetration into small (less than 1-3 mm wide) crevices typically created by butting pieces of conventional absorber 10 against one another or against other objects. And, such small crevices actually promote "crevice corrosion" by maintaining a stagnant zone in which water may accumulate without rapid drying or other removal. If chlorine is present, as is the case if the absorber is exposed to a salt water environment, it intensifies the corrosion by contributing to the production of hydrochloric acid, which can attack the conventional absorber 10, the non-absorbing adhesive 22, or the conductive object 60.

Thus, a crevice 70 of at least about 6 mm width is suitable for use with conventional sealants. However, conventional sealants do not absorb microwave radiation significantly (less than 3 dB absorption), thus the portion of conductive object 60 lying at the bottom of crevice 70 reflects incident radiation. However, application of a microwave absorbing adhesive 80 made according to the present invention solves this problem, because absorbing adhesive 80 both seals crevices 70 and absorbs incident microwave radiation.

In another embodiment, a sufficiently thick layer of the invention could be used to adhere a non-absorbing object to a conductive or non-absorptive surface, and still achieve sufficient absorption for many applications.

EXAMPLE 1

A thermosetting microwave radiation absorbing adhesive, i.e, one which would cure when heated, was made as follows.

Five hundred grams of ferric oxide ($\gamma$-Fe$_2$O$_3$) filaments (having 0.5 micron length and 0.06 micron typical diameter) and five hundred grams of methylethylketone (MEK) were mixed with an agitator. Fifteen grams of a dispersion aid and viscosity depressant, amino alkoxy titanium compound (Titanate brand LICA-4B), was added during agitation. Thirty minutes of high speed mixing produced a smooth and creamy slurry, in which microscopic examination showed agglomerates of ferric oxide filaments to be approximately 40-60 microns in length.

After sitting covered for 48 hours, four hundred grams of the slurry were blade mixed at 2400 RPM in a grinding mill with 1200 grams of steel balls as grinding media; to achieve the required milling vortex, 40 grams of MEK were added. Mixing continued at 2400 RPM for 120 minutes, after which the slurry was vacuum drained from the mixing pot. The slurry consisted of 45.4% solids after grinding. The fineness of grind reading of the slurry was 8+, i.e., the agglomerates of filaments were one micron or less in size. Scanning electron microscope measurements indicated the filaments had typical lengths of 0.5 micron and aspect ratios of about 8:1.

To manufacture the absorbing adhesive, the four components 1A-1D of Table I were prepared.

TABLE I

| Component | Weight (g) | Specific Gravity | Volume (cc) | Volume Percentage |
|---|---|---|---|---|
| 1A | 27.50 | 1.00 | 27.50 | 60.30 |
| 1B | 1.25 | 1.04 | 1.20 | 2.60 |
| 1C | 7.00 | 0.98 | 7.14 | 15.60 |
| 1D (total) | 101.00 | — | 22.95 | — |
| (solids) | 45.85 | 4.70 | 9.75 | 21.30 |

1A: "BOSTIK" No. 7210 polyamide based thermosetting adhesive resin by Emhart Chemical Group
1B: "IRGANOX" No. 1098 antioxidant by Ciba-Ceigy Chemical Company
1C: "HERCULES" No. Res-D-2137 tackifying resin by Hercules, Inc.
1D: ferric oxide/MEK slurry described above In a nitrogen atmosphere, components 1A and 1B were combined and heated to about 135° C. so that the components melted and blended together. Under continued heating, component 1C was added with constant agitation to mix it into the blend. Component 1D was added slowly, over a period of about twenty-five minutes, to prevent the mixture from cooling and to keep the solvent leaving the mixture at a slow rate. After all four components were combined, mixing continued for thirty minutes, after which the temperature was increased to 171.1° C. until there were no signs of solvent gas and the mixture had a smooth looking consistency. Mixing was stopped and the mixture was placed in a vacuum oven at 193.3° C. and twice subjected to about 508 mm Hg vacuum for ten minutes. After cooling, the mixture was ready for use.

EXAMPLE 2

A thermoplastic adhesive embodiment of the invention was prepared by compounding together the components of Table II on a two roll steel mill, using steel rolls and no external heating.

TABLE II

| Component | Weight (g) | Volume (cc) | Volume Percentage |
|---|---|---|---|
| 2A | 16.4 | 3.6 | 10.0 |
| 2B | 16.8 | 3.6 | 10.0 |
| 2C | 26.2 | 28.9 | 80.0 |

2A: Cobalt-adsorbed berthollide particle, "PFERRICO" No. 2670 from Pfizer, Inc., average particle length 0.4 micron and length:diameter ratio of 6:1.
2B: Cobalt-adsorbed hyper-magnetite particle as described in U.S. Pat. No. 4,226,909, average particle length 0.4 micron and length:diameter ratio of 6:1.
2C: Polyethylene vinyl acetate adhesive, No. 3754 from Minnesota Mining and Manufacturing Company After compounding, the material was heated and formed into a 1 mm thick layer. After cooling, flat annular rings were die-cut from the layer. Each ring had an outside diameter of 7.0 mm±0.0076 mm, an inside diameter of 3.0 mm±0.0076 mm, and a known thickness of approximately 1 mm. Each sample was placed, at a position known to ±0.1 mm, in a 6 cm long coaxial airline connected to a Hewlett-Packard Model 8510A precision microwave measurement system. The annular plastic substrates used to hold the samples in place had a relative permittivity of 2.58 and a relative permeability of 1.00.

Figure 2:
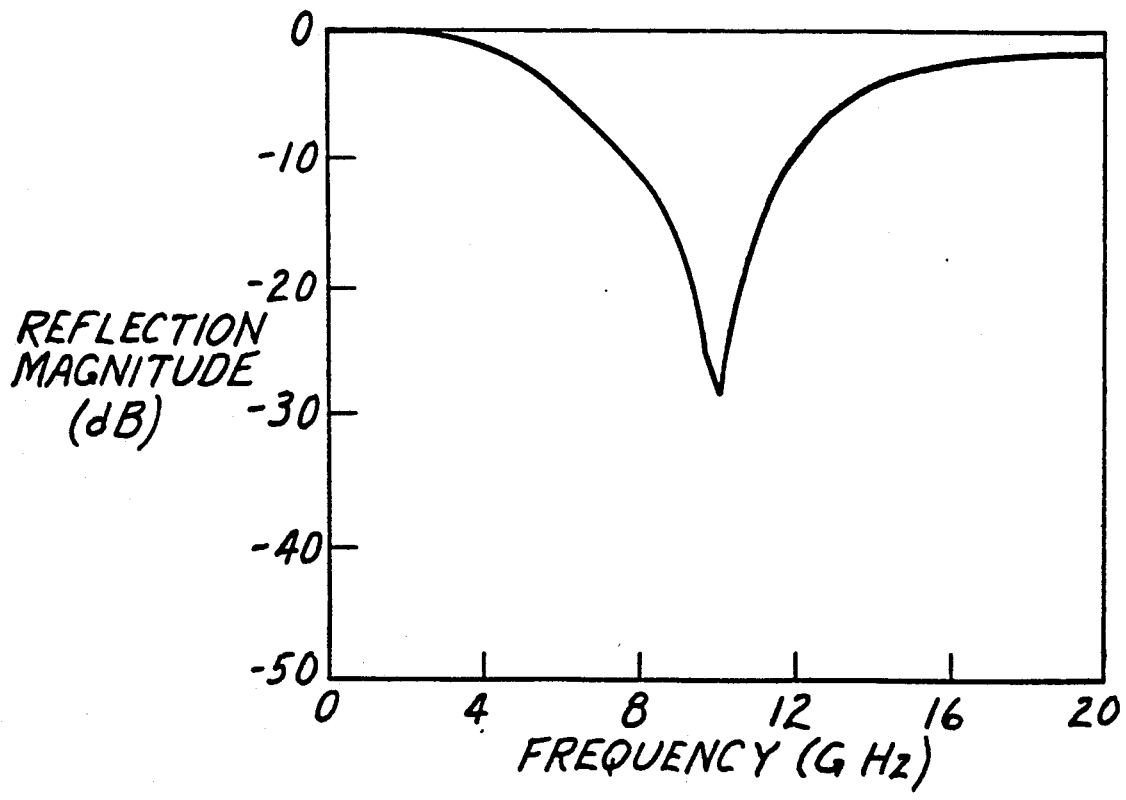
FIG. 2 is a graph of the calculated reflection magnitude of radiation normally incident upon a surface of an embodiment of the invention, as a function of incident radiation frequency.

Two hundred one step mode measurements from 0.1 to 20.1 GHz were made on each sample. Measurements of the transmission and reflection of the microwaves by the samples were used to calculate the real and imaginary parts of the permittivities and permeabilities of the samples as a function of incident frequency. These values were used to generate FIG. 2, which shows the predicted reflection magnitude of microwave radiation incident normal to a 2.83 mm thick layer of the thermoplastic adhesive adhered to a conductive 9round plane. The results predict the desired broad and strong absorption response, at least 10 dB over a 4 GHz range from 7.5 to about 11.5 GHz and at least 20 dB over a 1 dB wide range from 9.5 to 10.5 GHz.

EXAMPLE 3

A thermoplastic microwave radiation absorbing adhesive was made according to the teaching of U.S. patent application No. 07/302,427, as follows. One hundred parts by weight of commercially available iron filaments, typically 50-200 microns in length and 0.1 to 0.5 microns in diameter, were wetted with methylethylketone and pulverized to shorter lengths in a hi9h speed blade mixer for one hour. After the shortened filaments settled, the excess solvent was decanted away. The filaments were milled again, in methylethylketone with 800 grams of 1.3 millimeter diameter steel balls at 1500 revolutions per minute in a sand mill supplied by Igarashi Kikai Seizo Company Ltd. The milling time was 180 minutes.

Scanning Electron Microscopy (SEM) was used to measure the dimensions of the filaments. The diameters of the filaments were essentially unchanged by the milling, i.e., they ranged from 0.1 to 0.5 microns, and averaged 0.25 microns. Substantially all of the filaments had lengths of 10 microns or less, and averaged 3.0 microns. The aspect ratio, using the average length and diameter, was 12:1.

To manufacture the absorbing adhesive, the five components 3A-3E of Table III were prepared.

TABLE III

| Component | Weight (g) | Volume (cc) | Volume Percentage |
|---|---|---|---|
| 3A | 20.0 | 20.4 | 29.9 |
| 3B | 1.5 | 1.4 | 2.0 |
| 3C | 10.0 | 10.1 | 14.8 |
| 3D | 20.0 | 20.4 | 29.9 |
| 3E | 113.3 | 16.0 | 23.4 |

3A: "EURELON" No. XE-2110 polyamide by Sherex Chemical Company
3B: "IRGANOX" No. 1098 antioxidant by Ciba-Ceigy Chemical Company
3C: "VIKOFLEX" No. 7170 plasticizer by Viking Chemical Company
3D: "HERCULES" No. Res-D-2137 tackifying resin by Hercules, Inc.
3E: iron filaments described above In a nitrogen atmosphere, components 3A and 3B were combined and heated so that the components melted and blended together. Under continued heating, component 3C was blended into the mix. Component 3D was added and blended into the mix with constant agitation while raising the temperature to about 170° C. Component 3E was then gradually incorporated while continuing to heat and agitate the mixture until a homogenous blend was obtained. the mixture was poured while still hot into a 1.6 cm diameter cylindrical mold. After cooling to room temperature, the sample was removed from the mold. The resistivity to direction current of the sample was about $6 \times 10^5$ ohm-cm at room temperature.

We claim:

1. A non-conductive microwave radiation absorbing adhesive comprising dissipative particles dispersed in a polymeric dielectric material chosen from the group consisting of thermosetting adhesives and thermoplastic adhesives, in which the dissipative particles range in largest dimension from 0.1 to 150 microns, and are chosen from the group consisting of solid microspheres made from a dissipative material, hollow microbubbles made from a dissipative material, solid microspheres coated with a dissipative material, hollow microbubbles coated with a dissipative material, filaments made from a dissipative material, and flakes made from a dissipative material, and in which at least one dissipative material is chosen from the group consisting of tungsten, chromium, aluminum, copper, titanium, titanium nitride, molybdenum disilicide, iron, and nickel.

2. The absorbing adhesive of claim 1 in which the polymeric dielectric material is chosen from the group consisting of polyamides, polyethylenes, polypropylenes, polymethylmethacrylates, urethanes, cellulose acetates, vinyl acetates, epoxies, and silicones.

3. The absorbing adhesive of claim 1 in which the volume loading of the dissipative particles is between 1 and 60 percent.

4. The absorbing adhesive of claim 3 in which the volume loading of the dissipative particles is between 10 and 50 percent.

* * * * *

UNITED STATES PATENT AND TRADEMARK OFFICE
CERTIFICATE OF CORRECTION

| | | |
|---|---|---|
| PATENT NO. | : | 5,238,975 |
| DATED | : | August 24, 1993 |
| INVENTOR(S) | : | Eric J. Johnson et al. |

It is certified that error appears in the above-identified patent and that said Letters Patent is hereby corrected as shown below:

Title page, designation of inventors, line 3, "Nielson"
  should be --Nielsen--.
  Column 2, line 8, delete "05 and 10nm" and insert
  --0.5 and 10nm--.
  Column 3, line 20, delete "hermally" and insert
  --thermally--.
  Column 5, line 36, delete "9round plane" and
  insert --ground plane--.

Signed and Sealed this

Eighth Day of March, 1994

Attest:

BRUCE LEHMAN

*Attesting Officer*  Commissioner of Patents and Trademarks